United States Patent [19]

Rose

[11] 4,065,227

[45] Dec. 27, 1977

[54] CONTROL CIRCUIT

[76] Inventor: Ronald N. Rose, 5960 Main St. NE., Minneapolis, Minn. 55432

[21] Appl. No.: 715,190

[22] Filed: Aug. 17, 1976

[51] Int. Cl.² ............... F04B 49/00; G02B 27/00; H03K 3/42
[52] U.S. Cl. .................................. 417/45; 250/551; 307/311; 137/392
[58] Field of Search ............... 417/36, 44; 250/551; 307/311; 137/392

[56] References Cited

U.S. PATENT DOCUMENTS

| 3,524,986 | 8/1970 | Harnden | 250/551 |
| 3,667,022 | 5/1972 | Quinn | 417/36 |
| 3,777,188 | 12/1973 | Mazor | 307/311 |
| 3,916,213 | 10/1975 | Luteran | 137/392 |
| 3,943,367 | 3/1976 | Baker | 250/551 |

Primary Examiner—William L. Freeh
Attorney, Agent, or Firm—Neil B. Schulte

[57] ABSTRACT

A circuit to maintain the water level between low and high predetermined limits in a sump in which the signal from an upper limit probe operates a first lamp which illuminates a photo resistor controlling the gate of a triac. The triac turns on and enables a second lamp connected to a lower limit probe which illuminates the photo resistor and holds the triac on until the fluid level drops below the lower limit probe.

9 Claims, 1 Drawing Figure

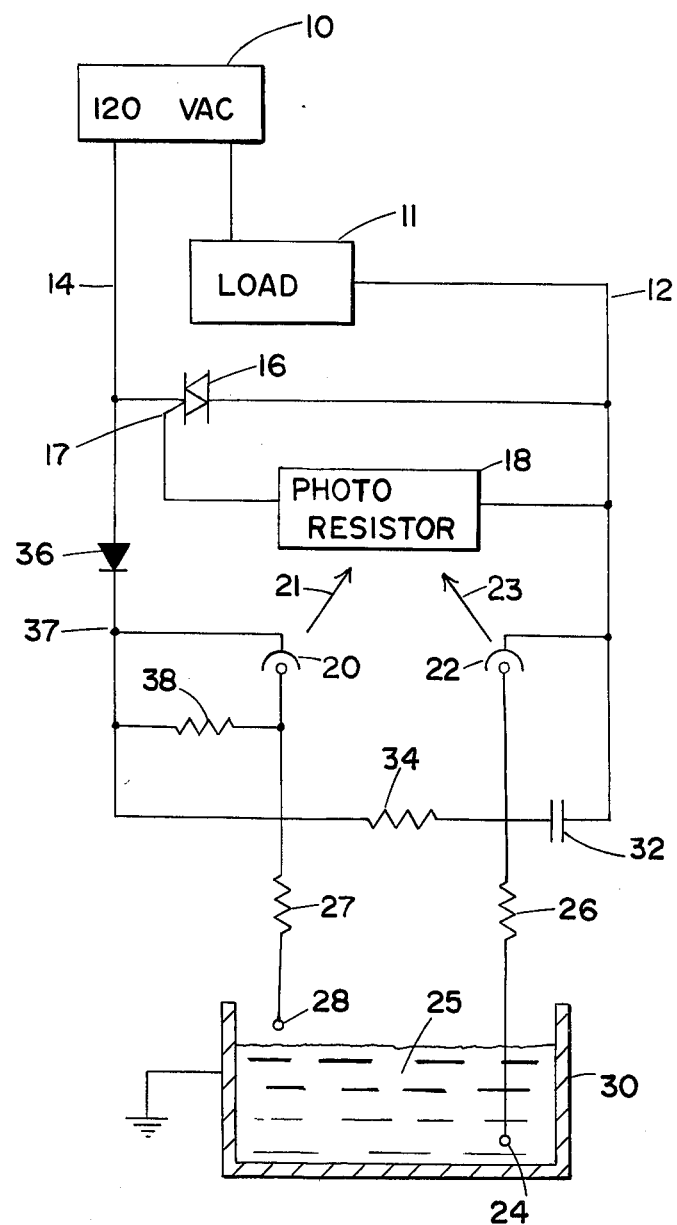

CONTROL CIRCUIT

BACKGROUND OF THE INVENTION

The circuit of my invention may be used to control and maintain any medium between desired limits. It could be used to control temperatures, flow rates, light levels, the position of garage doors, or any of a number of other functions where upper and lower limits can be detected with a suitable probe or switch. In this application the control circuit is incorporated into a preferred embodiment wherein the liquid level in a sump is maintained by means of upper and lower limit probes. The invention is not limited to sump pumps, however, and may be incorporated into a wide variety of different devices.

In the prior art relative to liquid level control several approaches have been known including mechanical float switches, capacitive switches, sonic switches, and conductivity type switches. In the preferred embodiment conductivity type switches are utilized because they allow the switching device itself to be mounted remotely from the liquid thus reducing corrosion problems. Such switches also permit the control circuit to be sealed against weather and other ambient conditions. In the past, conductivity type switches have often encountered problems with electrolysis of the probes caused by the flow of current therethrough. For a reverse flow there has often been a problem with plating of the probes with undesirable substances. My invention overcomes these problems with the circuit described hereinafter.

SUMMARY OF THE INVENTION

Briefly, the present invention utilizes a circuit wherein fluid contact on the upper limit probe activates a light which in turn lowers the resistance in a photo resistor. The photo resistor is connected to the gate of a triac so as to turn it on and start a sump pump lowering the fluid level. The triac also presents power to a second light which is connected to a lower limit probe which will then illuminate the photo resistor and hold the triac on even though the first light connected to the upper limit probe immediately turns off in response to the lowering liquid level. AC power is used to nullify the electrolytic effect in the lower limit probe. In addition, the power is on only during the interval when the water is being lowered by the pump from the upper limit probe to below the lower limit probe. Thus, current flow is held to a minimum. To avoid any capacitive reactance in the upper limit probe, which could cause erratic triggering of the switch, the current thereto is rectified by a diode. It may therefore be seen that it is an object of my invention to provide an improved control circuit for maintaining any desired medium between predetermined limits which is especially suitable for the maintenance of liquid level as, for example, in a sump. Further objects and advantages will become apparent from the following description and drawing.

BRIEF DESCRIPTION OF THE DRAWING

The drawing shows a schematic diagram of the control circuit as it could be used for maintaining the fluid level in a sump.

DESCRIPTION OF THE PREFERRED EMBODIMENT

Referring to the drawing the circuit is connected to a 120 volt AC power source 10 on the high side through line 14, and on the low or grounded side through a load 11 and line 12. Load 11 may comprise, for example, the windings of the electric motor which operates the sump pump. Current to the load is controlled by a triac 16 whose gate 17 is, in turn, controlled by a photo resistor 18. If the photo resistor receives illumination from either of the neon lamps 20 or 22, as indicated by arrows 21 and 23 respectively, its resistance is lowered. This lowers the voltage at the gate 17 of triac 16 which causes triac 16 to conduct power to load 11 and operate the sump pump.

A lower limit probe 24 is immersed in the fluid 25 in a sump 30, as shown, and connected through a resistor 26 to lamp 22. The sump and the water therein are at ground potential. There is no current flow through the lower limit probe because it is connected through the motor windings to the low or grounded side of the 120 volt power source 10. It should be noted that normal 120 volt power lines are already grounded and therefore there is no need for an internal ground connection in the circuit itself. Since there is no conduction in the lower probe, even when the water level has risen above the lower probe, there is no wasted current, electrolytic erosion, or plating problems.

Even though load 11 is not operating there is a sufficient electrical connection therethrough to produce a charging path for a capacitor 32 in series with a resistor 34 and a diode 36. As capacitor 32 is charged by the rectified pulses of DC current from diode 36, a DC potential is created at point 37 in the circuit so that neon lamp 20 is ready to be ignited. When the fluid 25 rises high enough to make contact with upper limit probe 28 the DC potential is discharged through a resistor 38 and a resistor 27 into the fluid 25. The momentary voltage across resistor 38 is also placed across neon lamp 20 which fires and momentarily illuminates photo resistor 18. Triac 16 turns on starting the sump pump 11. With the motor in load 11 operating, the voltage drop thereacross raises the voltage on line 12 which voltage is then presented to neon lamp 22. The firing voltage is exceeded and neon lamp 22 ignites to illuminate photo resistor 18 and hold the circuit on. When the sump pump lowers the fluid level to a point beneath lower limit probe 24 the circuit through resistor 26 is broken and the lamp goes dark. The resistance of photo resistor 18 again rises turning off triac 16 and stopping the pump. The circuit remains off until the fluid level again reaches upper limit probe 28.

It may be seen that the net current flow is very small. A momentary DC discharge through upper limit probe 28 plus a small current sufficient to run lamp 22 through lower limit probe 24 during the pump-down comprise the only electrical energy consumed. After the liquid level is lowered and the pump stops there is no current consumption at all in the standby state. The electrical resistance of fluid 25 may vary over wide range without affecting the operation of the circuit. Since there are no moving parts such as relays, floats, or the like, the system is extremely rugged and resistant to shock, vibration, and temperature extremes. All of these advantages may be present in the circuit shown even though modified somewhat. Accordingly, I do not intend to be bound to the exact circuit description disclosed in the drawing but rather only by the claims that follow.

I claim:

1. A control circuit for maintaining a medium between upper and lower limits comprising:
    upper and lower limit probes for detecting the medium at said upper and lower limits respectively;
    medium control means to move said medium at least between said upper and lower limits;
    a power source;
    a switching means controlled by a radiation sensitive means, said medium control means and said switching means connected in series across the power source;
    a first radiation producing means connected to and operable by the voltage from the connection point between the medium control means and the switching means, said first radiation producing means controlled by a signal from said lower limit probes; and
    a second radiation producing means connected to the circuit on the other side of the switching means from said first radiation producing means and controlled by said upper limit probe, both of said radiation producing means situated to direct radiation at the radiation sensitive means.

2. The apparatus of claim 1 in which said switching means comprises a triac with a gate controlled by a light sensitive resistor which resistor comprises the radiation sensitive means.

3. The apparatus of claim 1 in which said probes comprise conductive probes positioned to conduct current into the medium upon contact therewith, and connected in series with the radiation producing means to control the operation thereof.

4. The apparatus of claim 3 in which said medium control means comprises an electrically powered pump.

5. The apparatus of claim 4 in which said switching means comprises a triac with a gate controlled by a light sensitive resistor which resistor comprises the radiation sensitive means.

6. A control circuit to maintain a medium between first and second limits comprising;
    moving means to move the medium at least between the first and second limits;
    an electronic switching means connected to the moving means and adapted to be connected to a power source so as to gate power to the moving means, the gate of said electronic switching means controlled by a light sensitive resistor;
    first and second lamps optically coupled to the light sensitive resistor, said first lamp adapted to operate in response to a first sensing means that senses the medium at the first limit and said second lamp adapted to operate in response to a second sensing means that senses the medium at the second limit but said second lamp operable only after being enabled by the activation of said electronic switching means.

7. The apparatus of claim 6 in which said moving means comprises an electrically powered pump.

8. The apparatus of claim 6 in which said electronic switching means comprises a triac.

9. The apparatus of claim 8 in which said moving means comprises an electrically powered pump.

* * * * *